HOWARD & BOUSFIELD.
Horse Hay Rake.
No. 112,461.
3 Sheets—Sheet 2.
Patented Mar. 7, 1871.
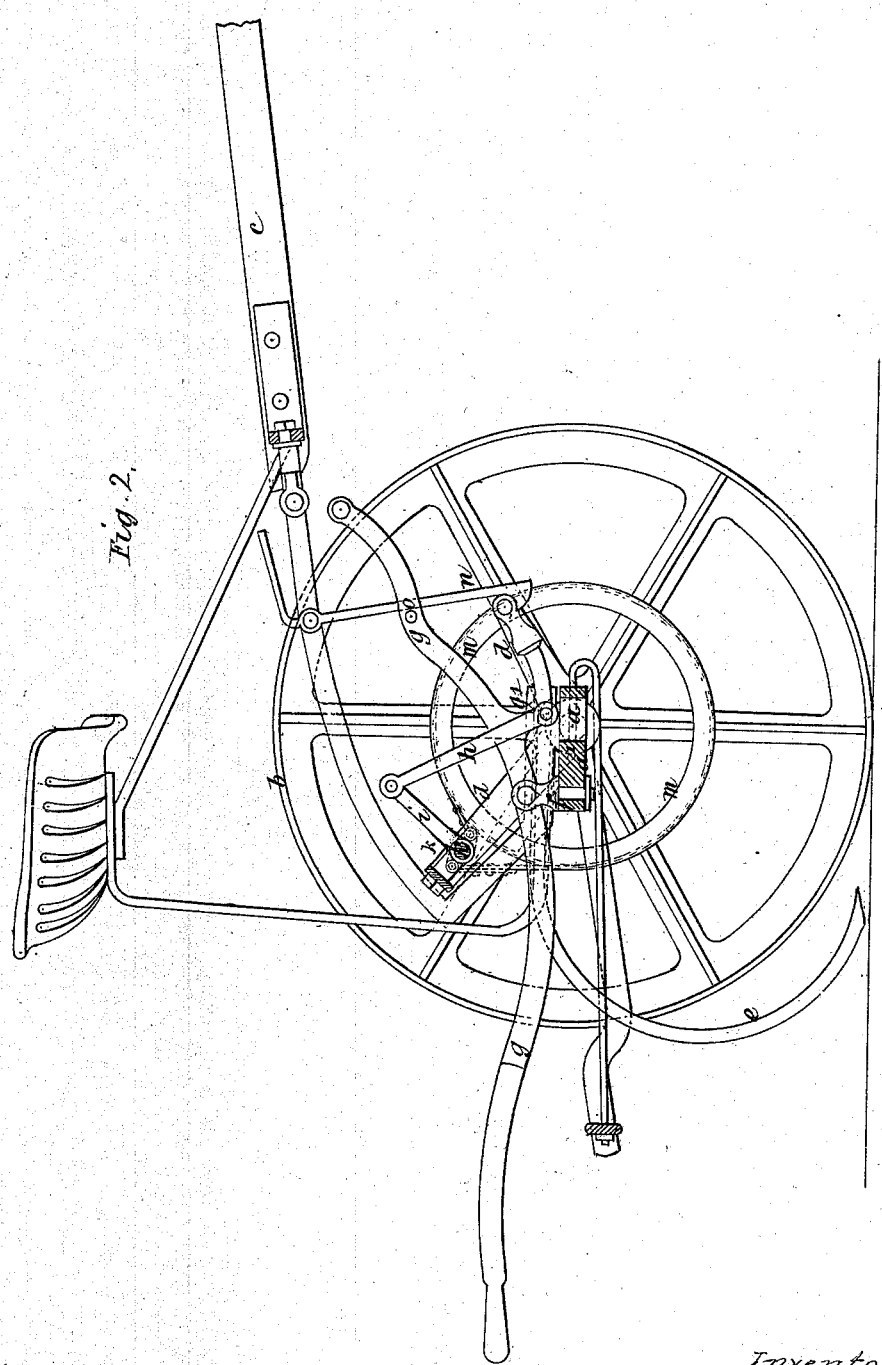

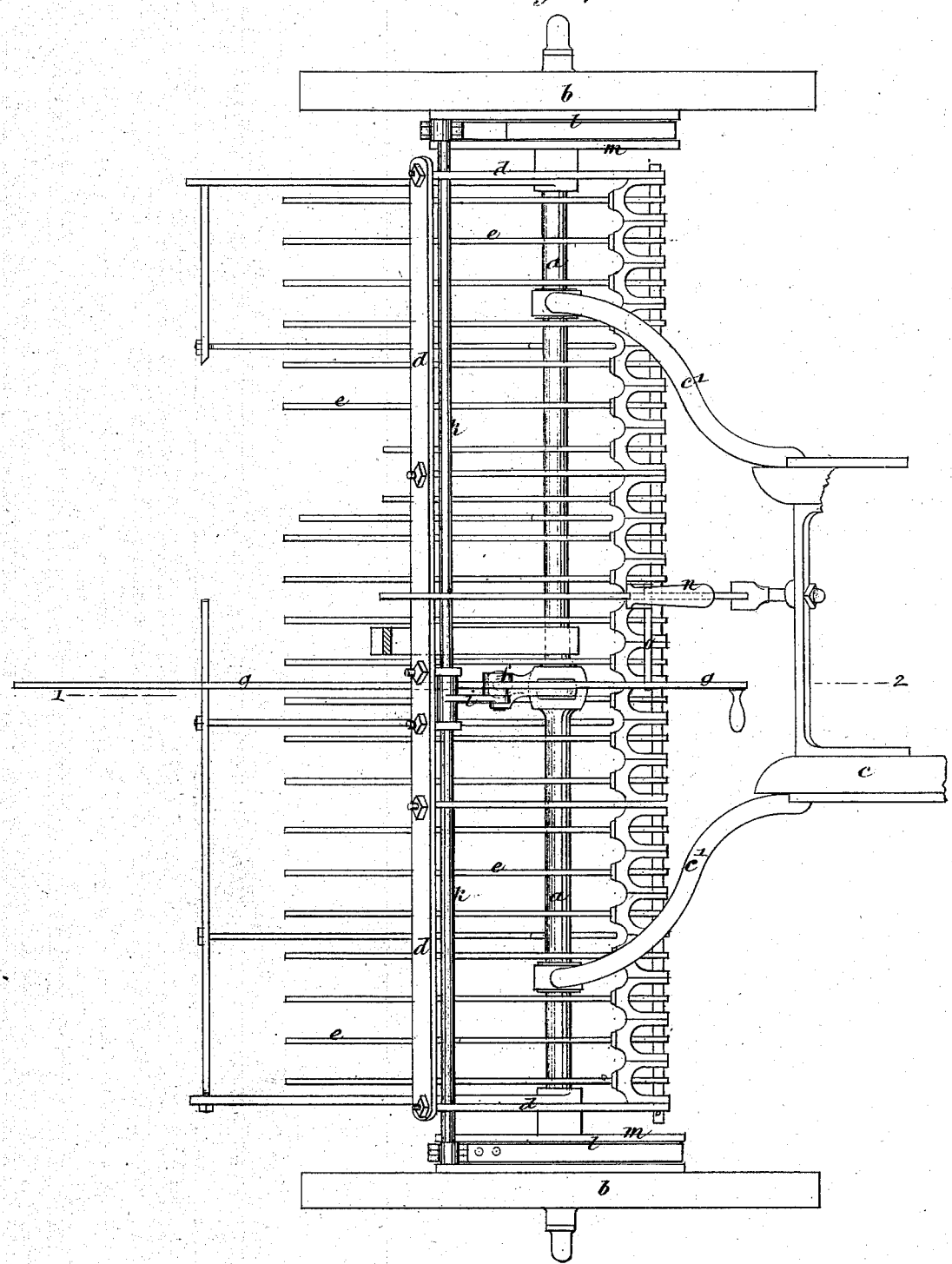

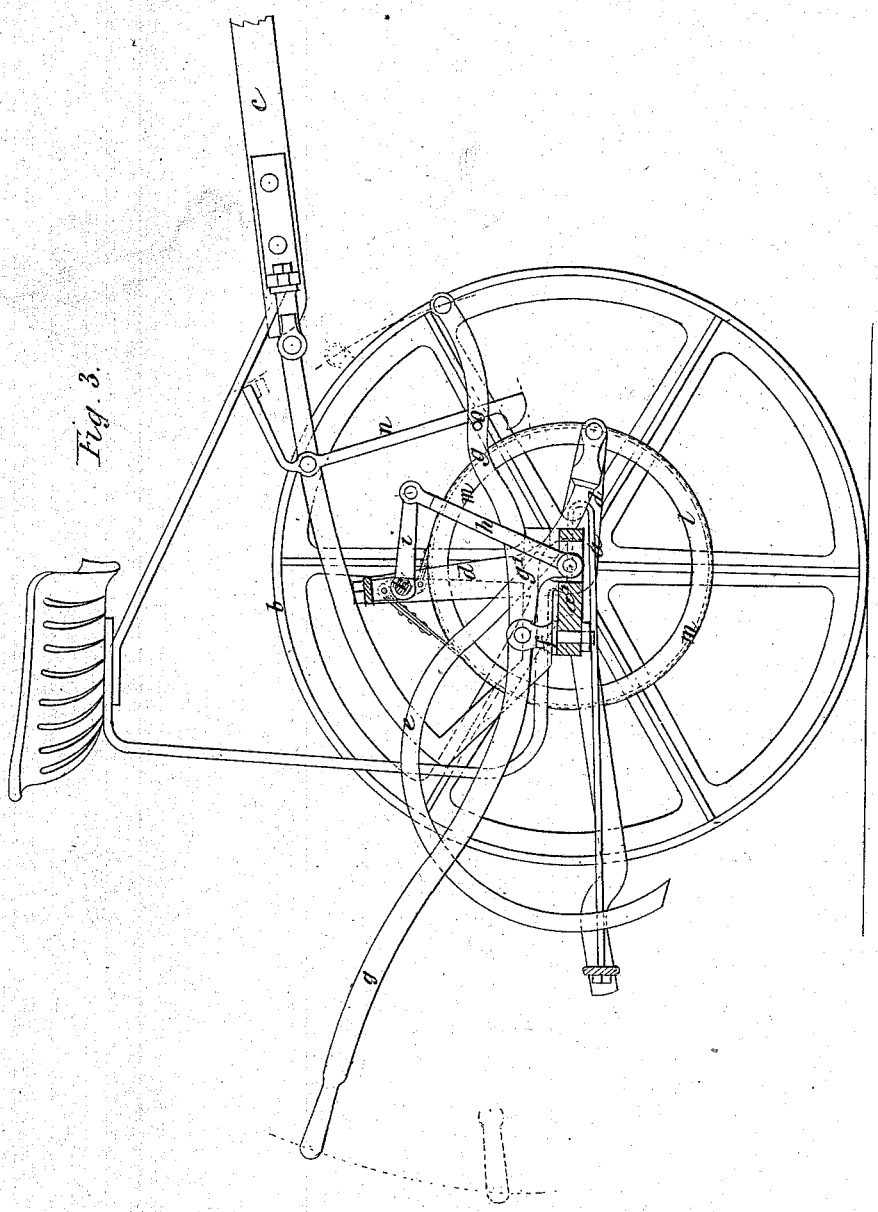

UNITED STATES PATENT OFFICE.

JAMES HOWARD AND EDWARD TENNEY BOUSFIELD, OF BEDFORD, ENGLAND.

IMPROVEMENT IN HORSE HAY-RAKES.

Specification forming part of Letters Patent No. 112,461, dated March 7, 1871.

*To all whom it may concern:*

Be it known that we, JAMES HOWARD and EDWARD TENNEY BOUSFIELD, of Bedford, in the county of Bedford, England, have invented a new and Improved Construction of Horse-Rakes; and we do hereby declare that the following is a full, clear, and exact description of the same, reference being had to the accompanying drawing, forming a part of this specification.

This invention relates to an improved arrangement of leverage to be applied to self-acting rakes or grass-collectors.

The object sought is to provide a leverage with a very limited range, to be operated either by hand or foot, which leverage, when put in action, will cause friction-bands to come in contact with rings or flanges cast upon the traveling wheels, and thereby, as the implement advances, cause the rocking frame which carries the tines or other operating-instruments to rise and lift them from the ground.

In the drawing, Figures 1, 2, and 3 show our improvements as applied to a horse-rake, Fig. 1, Sheet I, being a plan view of the implement; Fig. 2, Sheet II, a transverse section taken in the line 1 2 of Fig. 1, with the tines in the ground; and Fig. 3, Sheet III, a similar view, with the tines raised to their highest elevation.

$a\ a$ is the axle of the running wheels $b\ b$, and to it the shafts $c\ c$ are connected, as usual, by draft-irons $c'\ c'$. On this axle the rocking frame or cradle $d$, which carries the tines $e\ e$, is mounted, as heretofore.

At the middle of its length the axle is formed with a loop or central opening, to give space for the movement of the arrangement of levers, to be presently explained, and at this part it is provided with a lateral extension, $a'$. This extension carries a fixed stud, $f$, upon which is centered a double-ended lever, $g$, of limited range. This lever $g$ is placed longitudinally at or near the middle of the implement, and it is intended to be operated at pleasure, either by the hand or the foot of the attendant, for the purpose of giving the motion for lifting the tines from the ground from time to time and discharging the collected produce. This double-ended lever is furnished with a short arm, $g'$, at its under side, which projects when depressed into the before-mentioned loop of the axle of the carrying-wheels. Jointed to this arm $g'$ is a link, $h$, which connects with an arm, $i$, that is fitted to a transverse shaft, $k$, having its bearings in the tine-rocking frame $d$. This transverse shaft $k$ is fitted at its extremities with lugs, to which are respectively attached the opposite ends of one of a pair of friction-bands, $l\ l$, made, preferably, of metal. These bands are laid around friction-rings $m$, cast on or attached to the carrying-wheels, and are so arranged as to leave the friction-rings free to turn within the bands.

When, however, the transverse shaft $k$ is rocked in its bearings during the traverse of the implement through the double-ended rock-lever being moved by the attendant from the position shown in Fig. 2, Sheet II, by the depression of the foot end of the lever, the bands $l\ l$ will be caused to nip the friction-rings, and the tine-frame, which was up to this moment independent and loose on the axle, being now made fast to the traveling wheels, the further progress of these wheels will cause the frame $d$ to rise and lift the tines off the ground, as shown in Fig. 3, thereby freeing the tines of the cut produce which they had collected.

The release of the rock-lever from the pressure of the foot or the hand (as the case may be) of the attendant will instantly slacken the friction-bands, disconnect the frame $d$ from the carrying-wheels, and allow the tines to fall by their own weight to the ground.

For the purpose of keeping the frame $d$ in the proper position for presenting the tines to their work, a pendent catch, $n$, is provided, which catches under the tine-bar. When it is desired to lift the frame $d$ this catch is thrown out of reach of the tine-bar by a pin, $o$, on the lever $g$ striking and forcing back the catch, as shown at Fig. 3.

Having now set forth the nature of our invention, we claim—

The combination of lever $g$, link $h$, arm $i$, frame $d$, shaft $k$, friction-rings $m$, and bands $l$, substantially as and for the purpose specified.

In witness whereof we, the said JAMES HOWARD and EDWARD TENNEY BOUSFIELD, have hereunto set our hands the 5th day of December, in the year of our Lord 1870.

JAMES HOWARD.
EDWARD TENNEY BOUSFIELD.

Witnesses:
  H. K. WHITE,
    66 *Chancery Lane.*
  W. W. WYNN,
    24 *Royal Exchange, London.*